(12) United States Patent
Russell et al.

(10) Patent No.: US 11,559,151 B2
(45) Date of Patent: Jan. 24, 2023

(54) ANTIMICROBIAL WASHABLE PILLOW

(71) Applicant: Tempur World, LLC, Lexington, KY (US)

(72) Inventors: Sarah Russell, Duffield, VA (US); Stephen Wallace, Duffield, VA (US); Simon Simonsen, Aarup (DK); Anthony G. Turoso, Lexington, KY (US)

(73) Assignee: TEMPUR WORLD, LLC, Lexington, KY (US)

( * ) Notice: Subject to any disclaimer, the term of this patent is extended or adjusted under 35 U.S.C. 154(b) by 80 days.

(21) Appl. No.: 16/695,933

(22) Filed: Nov. 26, 2019

(65) Prior Publication Data

US 2020/0214477 A1   Jul. 9, 2020

Related U.S. Application Data

(60) Provisional application No. 62/789,076, filed on Jan. 7, 2019.

(51) Int. Cl.
*A47G 9/00* (2006.01)
*A47G 9/10* (2006.01)
*A47G 9/02* (2006.01)

(52) U.S. Cl.
CPC ............ *A47G 9/007* (2013.01); *A47G 9/0253* (2013.01); *A47G 9/10* (2013.01); *A47G 2009/1018* (2013.01)

(58) Field of Classification Search
CPC ............ A47G 9/007; A47G 9/10; A47G 2009/1018; A47G 9/0253
See application file for complete search history.

(56) References Cited

U.S. PATENT DOCUMENTS

| | | |
|---|---|---|
| 3,790,975 A | 2/1974 | Phillipp |
| 5,228,158 A | 7/1993 | Park |
| 5,530,978 A | 7/1996 | Johenning |
| 5,632,944 A | 5/1997 | Blackwell |
| 6,115,861 A | 9/2000 | Reeder |
| 6,196,156 B1 | 3/2001 | Denesuk |
| 6,256,816 B1 | 7/2001 | Law |
| 6,308,354 B1 | 10/2001 | Lilly et al. |
| 6,537,475 B1 | 3/2003 | Studholme |
| 6,723,428 B1 | 4/2004 | Foss et al. |
| 7,051,389 B2 | 5/2006 | Wassilefky |

(Continued)

FOREIGN PATENT DOCUMENTS

| | | |
|---|---|---|
| AU | 2019284014 | 7/2020 |
| CA | 2912121 | 5/2016 |

(Continued)

OTHER PUBLICATIONS

Translation of CN-109880157-A (Year: 2019).*
European Patent Office; European Search Report for app. No. 20150578.1 dated Apr. 28, 2020, 11 pgs.
South Africa Application No. 20200057, filed Jan. 6, 2020 titled Antimicrobial Washable Pillow.

*Primary Examiner* — Michael Safavi
(74) *Attorney, Agent, or Firm* — Stites & Harbison, PLLC; Terry L. Wright

(57) ABSTRACT

A washable pillow comprising of a molded foam core with antimicrobial resistance encased in a washable netting and a sleeve. The pillow may be washed and dried using conventional household methods without significant damage or loss of mechanical properties.

20 Claims, 3 Drawing Sheets

(56) References Cited

U.S. PATENT DOCUMENTS

| | | | |
|---|---|---|---|
| 7,415,742 B2 | 8/2008 | Wassilefsky | |
| 7,423,003 B2 | 9/2008 | Volpenhein et al. | |
| 8,777,076 B1 | 7/2014 | Carrier | |
| 9,271,588 B1 | 3/2016 | Phillips et al. | |
| 2001/0018777 A1 | 9/2001 | Walpin | |
| 2005/0085567 A1 | 4/2005 | Foss et al. | |
| 2005/0278852 A1 | 12/2005 | Wahrmund et al. | |
| 2007/0044239 A1 | 3/2007 | Leifermann et al. | |
| 2008/0098917 A1 | 5/2008 | Rikihisa | |
| 2008/0155753 A1 | 7/2008 | Cretsinger | |
| 2008/0233062 A1 | 9/2008 | Krishnan | |
| 2008/0292560 A1* | 11/2008 | Tamarkin | A61K 8/046 424/45 |
| 2009/0142551 A1 | 6/2009 | Fox | |
| 2010/0310810 A1 | 12/2010 | Bond | |
| 2010/0312208 A1 | 12/2010 | Bond | |
| 2011/0159299 A1 | 6/2011 | Linforf | |
| 2012/0123005 A1 | 5/2012 | Motta | |
| 2012/0238978 A1 | 9/2012 | Weisman | |
| 2012/0238979 A1 | 9/2012 | Weisman | |
| 2012/0297547 A1 | 11/2012 | Myers | |
| 2012/0322903 A1* | 12/2012 | Karandikar | A01N 25/10 521/92 |
| 2013/0052900 A1 | 2/2013 | Jung et al. | |
| 2013/0122773 A1 | 5/2013 | Wahal et al. | |
| 2013/0150476 A1* | 6/2013 | Martin | C08G 18/282 521/170 |
| 2013/0263386 A1 | 10/2013 | Romero et al. | |
| 2014/0082846 A1 | 3/2014 | Blazar | |
| 2014/0271863 A1 | 9/2014 | Anderson | |
| 2014/0283303 A1 | 9/2014 | Rochlin | |
| 2015/0329997 A1* | 11/2015 | Switzer | A47C 31/001 5/698 |
| 2016/0135624 A1* | 5/2016 | Heidtmann | C08G 18/4837 5/638 |
| 2016/0367041 A1 | 12/2016 | Romero et al. | |

FOREIGN PATENT DOCUMENTS

| | | |
|---|---|---|
| CA | 3065909 | 7/2020 |
| CN | 102534851 A | 7/2012 |
| CN | 102732979 A | 10/2012 |
| CN | 105595711 A | 5/2016 |
| CN | 109880157 A * | 6/2019 |
| CN | 111407129 | 7/2020 |
| EP | 2243455 A1 | 10/2010 |
| EP | 3023384 A1 | 5/2016 |
| EP | 3677153 | 7/2020 |
| FR | 2963545 | 2/2012 |
| HK | 20011316 A | 7/2020 |
| JP | 2000079040 A | 3/2000 |
| JP | 2004358137 | 12/2004 |
| JP | 2005034489 A | 2/2005 |
| JP | 2006061670 A | 3/2006 |
| JP | 2007117575 | 5/2007 |
| JP | 2009101168 A | 5/2009 |
| JP | 2011098125 A | 5/2011 |
| JP | 2016104128 A | 6/2016 |
| JP | 2020121111 | 8/2020 |
| KR | 20200086229 A | 7/2020 |
| WO | 03/099079 A2 | 12/2003 |
| WO | 2012/160507 | 11/2012 |

* cited by examiner

ANTIMICROBIAL WASHABLE PILLOW

CLAIM TO PRIORITY

This non-provisional patent application claims priority to and benefit of, under 35 U.S.C. § 119(e), U.S. Provisional Patent Application Ser. No. 62/789,076, filed Jan. 7, 2019 and titled "Antimicrobial Washable Pillow", all of which is incorporated by reference herein.

FIELD OF THE INVENTION

The present application generally relates to pillows and cushions, and more particularly to a washable pillow or cushion including a molded viscoelastic foam core.

BACKGROUND OF THE INVENTION

The neck of a person lying in a supine or side-lying position is often out of alignment with the person's spine. This is commonly the case when the person's neck is supported by a pillow or multiple pillows, such that the neck lies at an angle defined by the deflected height of the pillow(s), wherein the angle is typically not co-planar with the spine. The deflected height of the pillow is closely related to the stiffness imparted by its constituent materials. Pillows containing viscoelastic foam may be used to encourage proper neck alignment.

Although pillows constructed at least in part with viscoelastic foam have many desirable properties, many viscoelastic foams have properties that can generate design challenges. For example, some viscoelastic foams have less durability and/or are weaker (e.g., tear strength, tensile strength, and the like) than other types of foam. As another example, some viscoelastic foams retain large quantities of water, and thus may be difficult to wash and dry. In light of these properties, improvements regarding the use of viscoelastic foam, particularly with respect to their washability, utilized in pillows and cushions continue to be welcome additions to the art.

SUMMARY OF THE INVENTION

Various embodiments of the present invention provide a pillow comprised of a molded viscoelastic foam core with an antimicrobial agent included within the viscoelastic molded foam core that is able to withstand repeated washing and drying with conventional detergents and laundry machines without damage or loss of mechanical properties.

The present invention provides, in one aspect, a washable pillow comprised of a molded viscoelastic foam core with a hydrophobicity defined by a measured water uptake between about 0% (w/w) and about 30% (w/w), an average cell size between about 0.16 mm and about 3 mm, and an air permeability between about 1.0 liters per second and about 6.0 liters per second, where the molded viscoelastic foam core has a drying capacity defined by a reduction in the measured water uptake after washing and drying and a post-drying measured moisture level that is less than about 20% and an antimicrobial agent incorporated into the foam formulation used to generate the molded viscoelastic foam core.

In some embodiments, the viscoelastic foam used in forming the molded foam core has a hydrophobicity between about 25% (w/w) and about 30% (w/w). In other embodiments, the viscoelastic foam of the molded foam core has an average cell size between about 0.17 mm and about 2 mm. In still other embodiments, the molded viscoelastic foam of the molded foam core has an air permeability between about 2.0 liters per second and about 4.0 liters per second.

In some embodiments, the washable pillow further includes a sleeve defining a cavity, the sleeve including a first and second netting layer that are connected together to form a cavity between them. In some embodiments, the first and the second netting layers are constructed of a polyester material.

In some embodiments, the antimicrobial agent in the molded foam core includes silver ions or zinc as active ingredients. In other embodiments, the antimicrobial agent in the molded foam core includes zinc omadine, thiabendazole, and oxydipropyl dibenzoate. In some embodiments, the antimicrobial agent is added at a concentration ranging from about 500 ppm to about 700 ppm. In still other embodiments, the washable pillow includes a crosslinking agent incorporated into the foam formulation used in the molded viscoelastic foam core. In such embodiments, an amount of the crosslinking agent used ranges from about 0.8 to 5 wt % based on a weight of polymeric compounds having isocyanate-reactive groups and chain-extending agents.

In another aspect, a method of washing a molded foam core pillow is disclosed, where the method includes removing a cover from a molded viscoelastic foam core, where the molded viscoelastic foam core remains within a netting, where the molded viscoelastic foam core has a hydrophobicity defined by a measured water uptake between about 0% (w/w) and about 30% (w/w), an average cell size between about 0.16 mm and about 3 mm, and an air permeability between about 1.0 liters per second and about 6.0 liters per second, and where an antimicrobial agent incorporated into the foam formulation used for molded viscoelastic foam core; washing a molded viscoelastic foam core on a wash cycle; and drying the molded viscoelastic foam core on high heat, where the drying reduces the measured water uptake of the molded viscoelastic foam to a second measured moisture level of the molded viscoelastic foam core to less than about 20% in a predetermined time.

Regarding the washing step, in some embodiments, the wash temperature for the wash cycle is between about 30 degree Celsius and about 60 degrees Celsius. In some embodiments, the measured water uptake is between about 25% and about 30%. In still other embodiments, the second measured moisture level (after drying) of the molded viscoelastic foam core is between about 11% and about 14%.

Regarding the drying step, in some embodiments, the high heat used in drying the pillow reaches a temperature between about 50 degrees Celsius and about 65 degrees Celsius or higher. In other embodiments, the predetermined time for drying the pillow is between about 60 minutes and about 120 minutes. In still other embodiments, the predetermined time for drying is about 60 minutes.

In yet another aspect an antimicrobial washable pillow is disclosed, the pillow including a molded viscoelastic foam core having a hydrophobicity defined by water uptake between about 25% (w/w) and about 30% (w/w), an average cell size between about 0.17 mm and about 3.0 mm, and an air permeability between about 2.0 liters per second and about 4.0 liters per second, with an antimicrobial agent including zinc omadine, thiabendazole at a concentration ranging from about 500 ppm to about 7000 ppm, and oxydipropyl dibenzoate incorporated into the foam formulation used in the creation of the molded foam core; and a polyester netting sleeve that defines a cavity in which the molded foam core is enclosed. Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the accompanying drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

The disclosed pillow includes a molded viscoelastic foam core, sometimes referred to as "memory foam" or "low resilience foam." Viscoelastic foam can have varying degrees of density, pressure responsiveness, porosity, thermal conductivity, thermal diffusivity, etc. However, viscoelastic foam is typically characterized by slow recovery and low resilience. The use of viscoelastic foam permits the pillow to conform to the shape of the portion of a person's body that contacts the pillow. While conventional materials typically exhibit constant stiffness or hardness in response to changing temperatures, the stiffness or hardness of viscoelastic foam is often temperature dependent, and in many cases is temperature dependent based upon body heat of a user (having a lower stiffness or hardness at an elevated temperature as compared to its stiffness at a cooler temperature). The body heat of a user acts to soften the portion of the pillow in contact with the body, while the portion of the pillow not contacting the body remains more firm. As a result, the disclosed pillow allows for greater comfort over conventional pillows by accommodating each user's body form.

Conventionally, viscoelastic foam materials cannot be nondestructively washed and dried. For example, most viscoelastic polyurethane foams are substantially hydrophilic, and as a result tend to absorb and retain liquid and exhibit swelling when washed or otherwise exposed to water. Hydrophilicity and limited air permeability in conventional viscoelastic foams makes complete drying of the viscoelastic containing pillow, cushion, or the like difficult. In addition, the tensile strength of such foams often decreases when wet, leading to fragility and frequent distortion, cracking, breaking, or fragmentation of the foam structure and loss of viscoelastic properties upon exposure to the mechanical stresses associated with typical washing and drying procedures. As a result, washing is generally not recommended for conventional viscoelastic foam pillows.

Figure 1:
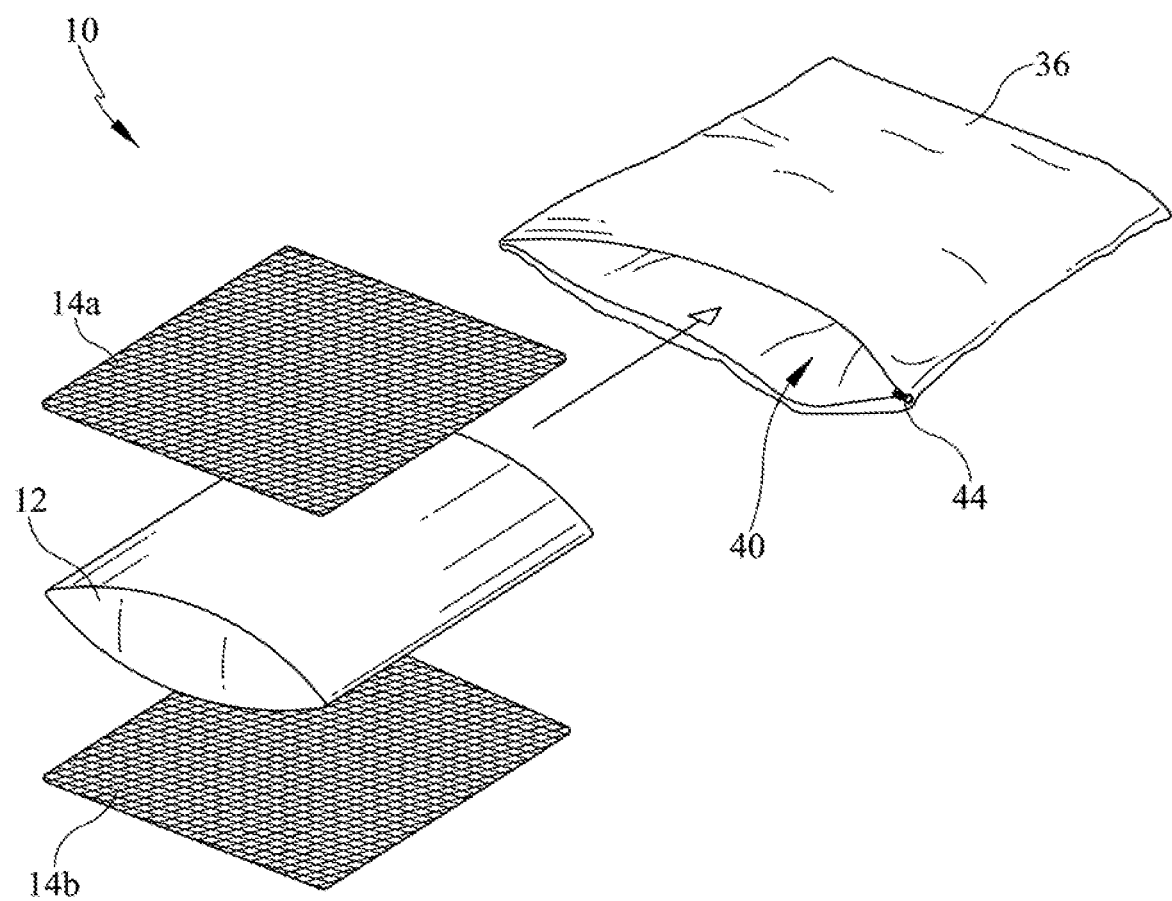
FIG. 1 is an exploded perspective view of an illustrative embodiment of a pillow consistent with the description herein.
Figure 2:
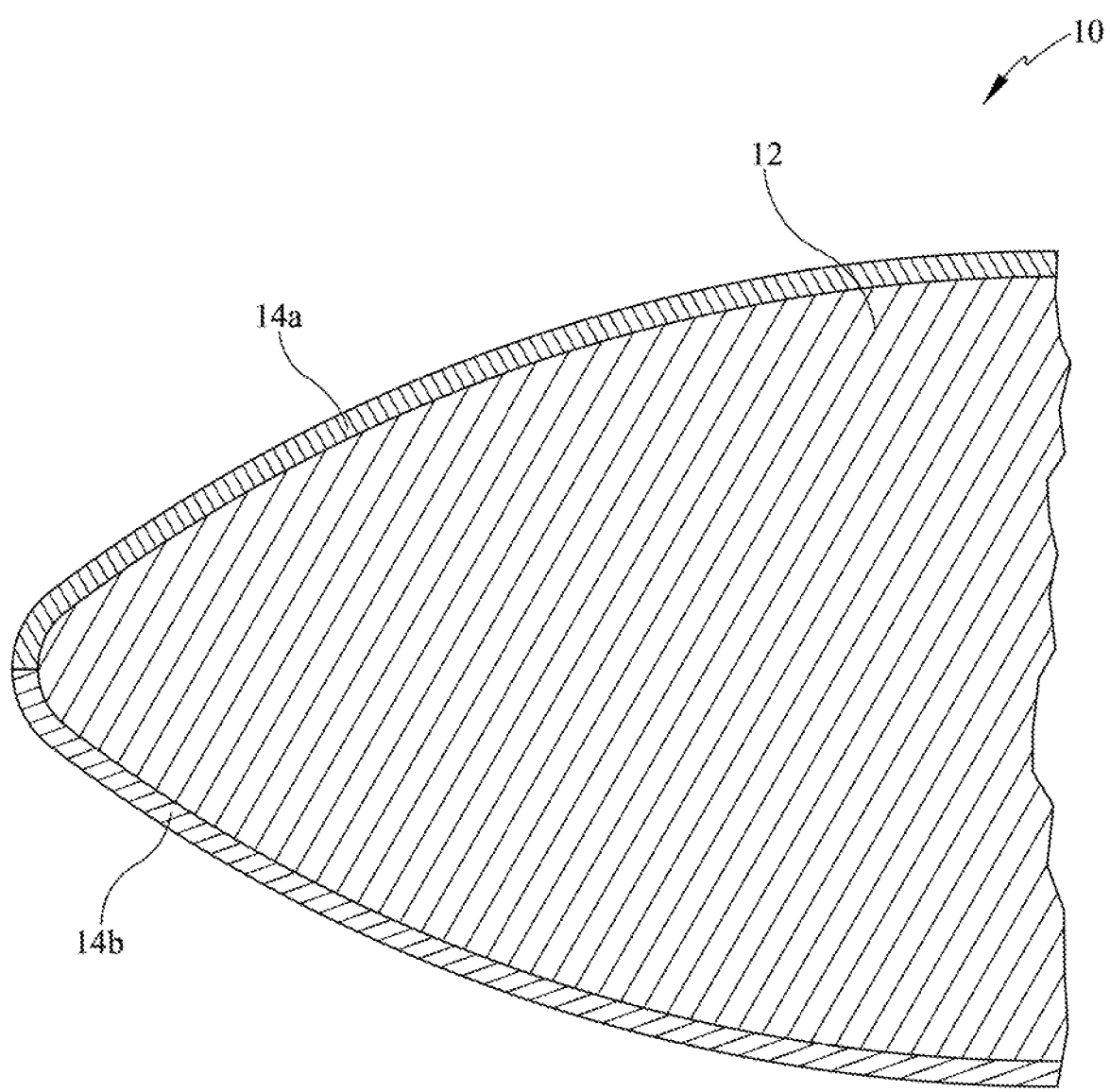
FIG. 2 is an assembled, partial cross-sectional view of the pillow of FIG. 1.

FIGS. 1 and 2 illustrate an antimicrobial washable pillow 10 having a molded viscoelastic foam core 12, which is a solid, continuous piece of foam. In some instances, the viscoelastic foam core 12 may be used alone, while in other instances the viscoelastic foam core 12 may include a quilted, multi-layered sleeve 14a, 14b that forms a cavity within which the viscoelastic foam core 12 may be placed, as illustrated in FIG. 1. In some embodiments, the molded viscoelastic foam core 12 may a density of about 55 kg/m$^3$. However, a suitable density for the molded viscoelastic foam core 12 for an average weight pillow (for example) can be between about 30 and about 140 kg/m$^3$, and in some embodiments between about 40 and about 100 kg/m$^3$, and in other embodiments between about 45 and about 80 kg/m$^3$, and especially between about 50 and about 70 kg/m$^3$. Further, a suitable density for the molded viscoelastic foam core 12 for a lightweight pillow (again, by way of example) can be less than about 50 kg/m$^3$. Likewise, a suitable density for the molded viscoelastic foam core 12 for a heavyweight pillow, for example, can be greater than about 110 kg/m$^3$. Alternatively, the molded viscoelastic foam core 12 can have any density in accordance with the desired characteristics of the pillow 10. In addition, the molded viscoelastic foam core 12 may, in some embodiments, possesses an indentation load deflection, or "ILD," of 65% between 100-500 N loading, and a maximum 10% rebound according to the test procedure governed by the ASTM-D-1564 standard. Furthermore, the hardness of the molded viscoelastic foam core 12 may be between about 30 N and about 70 N, and in some embodiments between about 35 N and about 60 N, and in other embodiments between about 37 N and about 55 N.

The molded viscoelastic foam core 12, in some embodiments, may be the size of a traditional pillow, for example about 584 mm long, about 393 mm wide, and about 104 mm high and may also have thermally-responsive properties as described above. In other embodiments, the molded foam core may be about 609 mm long, about 393 mm wide, and about 134 mm high with the thermally-responsive properties as described above. In still other embodiments, the molded foam core may be in the form of a horseshoe, for example to be used as a travel pillow. In such embodiments, the pillow may be constructed of two separate molded foam cores, each having the following dimensions: about 284 mm long, about 152 mm wide, and about 74 mm high. The described dimension are not intended to be limiting, as a person of skill in the art would recognize that the molded foam core described herein may be of other dimensions and shapes as desired. The molded viscoelastic foam core 12 may be constructed or molded from a washable viscoelastic polyurethane foam material as will be further described.

As shown in FIGS. 1-2, the molded viscoelastic foam core 12 may, in some embodiments, also include a sleeve 14a, 14b covering the outside surface of the molded viscoelastic foam core 12. In some embodiments, the sleeve 14a, 14b may include a first fabric layer 14a and a second fabric layer 14b sewn together to form the sleeve 14a, 14b; while in other embodiments (not illustrated) the sleeve may be constructed of a single piece of fabric. In some embodiments this fabric sleeve is a washable netting. In some embodiments, this netting may be constructed of a knit fabric. In other embodiments, the netting may be constructed of a woven fabric; while in still other embodiments, the netting may be constructed of a non-woven fabric. In some embodiments, this fabric may be a polyester material; in other embodiments, the netting may be a polyester-blend.

With reference to FIG. 1, the pillow 10 may then be inserted within a cover 36. The cover 36 may surround and encases the pillow 10 and conforms to the shape of the pillow 10. The cover 36, in some embodiments, is made from a durable and washable fabric material, such as a cotton/polyester blend. Other materials may also be used. As shown in FIG. 1, an opening 40 extends across the cover 36 along the cover's edge. The pillow 10 may be inserted into the cover 36 through the opening 40. The pillow 10 may also be removed from the cover 36 through the opening 40 to facilitate the separate cleaning of the cover 36. In some instances, it may be desirable to clean the cover 36 more frequently than the washable pillow 10. It may be desirable, in some instances, that the cover of the pillow be suitable for use by those with various allergies; as such, in some embodiments, the cover may be certified by the Allergy and Asthma Foundation of America. In some embodiments, the opening 40 is closable to close the cover 36 around the pillow 10 and to open the cover 36 for removing the pillow 10. In such embodiments, a closure device 44 may be used to open and close the opening 40. In the illustrated embodiment, the closure device 44 is a zipper, although the closure device 44 could alternatively comprise snaps, buttons, hook and loop fastener material, overlapping flaps, laces, or other suitable fasteners. In other embodiments, the opening 40 may remain open, similar to a traditional pillowcase.

The viscoelastic foam used for the molded foam core 12 may be made from a polyurethane foam material. The viscoelastic foam may be selected for responsiveness to any range of temperatures. However, in some embodiments, temperature responsiveness in a range of a user's body temperatures (or in a range of temperatures to which the pillow 10 is exposed by proximity to a user's body resting thereon) may be desirable. As used herein, a viscoelastic foam is considered "responsive" to temperature changes where the viscoelastic foam exhibits a change in hardness of at least 10% measured by ISO Standard 3386 through the range of temperatures between 10 and 30 degrees Celsius. To further illustrate the "responsive" nature and latent water content or uptake of this material (e.g. the water content in ambient conditions), the viscoelastic foam was examined at various humidity conditions. Where used herein, "latent water uptake" refers to the uptake of water from ambient conditions (e.g. humidity). The ILD and weight of the pillow core were measured at 25 degrees Celsius and 55% relative humidity (RH). The pillow core was then placed into a humidity chamber at 25 degrees Celsius and then subjected to humidity conditions between the range of 30-90% RH for 24 hrs. After acclimation ILD and weight were measured. A maximum hardness change of 10% was observed between relative humidity range of 30-90% at 25 degrees Celsius. A maximum weight change of 7% was observed.

The molded viscoelastic foam core 12 may exhibit substantial hydrophobicity, which may limit swelling and water absorption during washing, and facilitates drying of the pillow 10. For example, the more hydrophobic an item, the less water that may be absorbed; conversely, the less hydrophobic an item the more water than may be absorbed. Numerous methods may be used to measure the hydrophobicity of a material. For example, hydrophobicity can be assessed by measuring the contact angle between the surface of a product and the edge of a water droplet deposited on the surface of the product. In general, a higher contact angle indicates greater hydrophobicity. Another common method for measuring hydrophobicity uses standard water ratings, which tests a material for absorption of liquid droplets containing water and an increasing proportion of isopropanol. In the standard rating scale, W0 corresponds to 100% water, and W10 corresponds to 100% isopropanol. Each incremental increase in the proportion of isopropanol lowers the cohesive properties within the droplet and therefore makes the droplet more susceptible to being absorbed into the material. An additional method for measuring hydrophobicity involves measuring water uptake of a product during washing, for example the pillow 10. Where used herein, "water uptake" refers to the amount of water that the pillow 10 was able hold after the wash and/or dry cycle. The product (e.g. the pillow 10) may be washed in a commercially available washing machine, for example, at a water temperature of 60 degrees Celsius. When referred to herein and not otherwise defined, the term "washing" or "wash cycle" is intended to mean a cycle from a commercially available washing machine, including both residential and industrial washing machine models. The particular specifications of a wash cycle may vary widely from washing machine to washing machine, including cycle time, speed, temperatures, etc. However, a wash cycle may be defined as including at least a wash stage and a rinse stage. During the wash stage, the washing machine may be filled to a certain water level. Both the water level, as well as the water temperature, may be set by a user, including through selection of various preset cycles on the washing machine (e.g. delicate, heavy duty, etc.), and/or determined by a sensor in the washing machine. The wash cycle also includes dispensing any detergents, stain treatments, fabric softeners, etc. from dispensers (which may be preloaded by a user), agitating the contents of the washing machine for a certain amount of time (which may be set by a user and/or determined by a sensor) and draining the water. During the rinse stage, the washing machine may be filled to a certain water level, which along with the water temperature, may be set by a user, including through selection of various preset cycles on the washing machine (e.g. delicate, heavy duty, etc.) and/or determined by a sensor. The load may then be agitated for a certain amount of time (which may be set by a user and/or determined by a sensor), and the water may be drained from the machine. In some instances, the wash cycle may optionally include additional stages, including but not limited to a pre-wash cycle, a spin cycle, an extra rinse cycle, and so on. These optional additional cycles may also vary by washing machine and/or user selection. For example, a spin cycle may extract moisture from the contents of the washing machine by spinning the tub of the washing machine around in order to "wring" additional liquid out of the contents of the washing machine. In some instances, the use may define the speed of the spin cycle; typically, faster spinning (e.g. the higher the rotations per minute of the tub) results in more liquid being removed.

The article may then be, for example, dried for two hours in a commercially available tumble dryer. When referred to herein and not otherwise defined, the term "drying" or "dry cycle" is intended to mean a cycle from a commercially available clothing dryer, including both residential and industrial clothing dryer models. The particular specifications of a dry cycle may vary widely from washing machine to washing machine, including cycle time, temperatures, etc. However, a dry cycle may be defined as including at least the injection or importation of air (which may or may not be heated air) and the drawing out moisture as the contents of the dryer are tumbled in a drum. In some instances a user may select, either manually through selection of various preset cycles, the temperature of the cycle and the length of the cycle. As a non-limiting example, many clothing dryers have "high", "medium", and "low" temperature settings, although this terminology is not limiting and may be referred to differently by different manufacturers. As an example, "high" heat may mean a temperature between about 50 degrees Celsius and about 65 degrees Celsius or higher, although this too may vary across various brands and/or models of dryers.

The weight of the article is measured before and after the washing treatment, as well as at after one hour of drying and after the full two hour drying treatment. Those weights are compared, and the percentage weight increase of the article after the washing and drying treatments, if any, can be used to determine the hydrophobicity in terms of water uptake. Any water remaining in the molded viscoelastic foam core immediately following the washing and drying treatments may evaporate during subsequent use.

The viscoelastic foam used for the molded foam core 12 may have relatively large and open cells within the foam matrix, in order to facilitate drying and increase the drying capacity of the pillow. The cells of the viscoelastic foam may be essentially skeletal structures in which many (if not substantially all) of the cell walls separating one cell from another do not exist, where the cells are defined by a plurality of supports or "windows", substantially no cell walls, or by a substantially reduced number of cell walls as compared to other types of viscoelastic foam. In some embodiments, the cells may be substantially round and uniform in size and shape. In other embodiments, cells may be of pentagonal dodecahedron morphology and exhibit irregular cell size distribution. Cell size may be measured using various methods familiar to those of ordinary skill in the art; for example, cell size may be measured using Porescan equipment. The viscoelastic foam used for the molded foam core 12 of the pillow 10 may have an average cell size (in vertical and/or horizontal diameter) between about 0.16 mm and about 3 mm, and in some embodiments between about 0.17 mm and about 2 mm, and in other embodiments between about 0.17 and about 1 mm. In other words, the foam used for the molded foam core 12 may have an average cell density between about 10 and about 65 cells/cm, and in some embodiments between about 12 and about 63 cells/cm, and in other embodiments between about 14 and about 62 cells/cm. In addition, the viscoelastic foam used for the molded foam core 12 may exhibit high air permeability, which may also speed and improve drying. Air permeability may be measured using various methods known to those of ordinary skill in the art, for example, according to ASTM D3574 or EN ISO 7231, using test samples with a size of 38 cm$^2$ or 25 cm$^2$ at a constant pressure of 125 Pa. When tested with a sample size of 38 cm$^2$ under 125 Pa constant pressure, the viscoelastic foam used for the molded foam core 12 of the pillow 10 may have air permeability of at least about 1.0 liters per second (L/s), at least about 2.0 L/s, at least about 3.0 L/s, or at least about 4.0 L/s. The viscoelastic foam used for the molded foam core 12 of the pillow 10 may have air permeability between about 1.0 L/s and about 5.0 L/s, in other embodiments between about 2.0 and about 5.0 L/s, and in still other embodiments between about 2.0 and about 6.0 L/s.

Suitable viscoelastic foams for the molded foam core 12 may be produced, for example, using a process that includes polyisocyanate and polymeric compounds having isocyanate-reactive groups. For example, such a viscoelastic foam may be produced in accordance with the methods disclosed in U.S. Patent Application Publication No. 2013/0150476, the entire contents of which are hereby incorporated by reference. Furthermore, some embodiments may further include a chain-extending or crosslinking agent, a compound having one isocyanate-reactive group, a catalyst, an antimicrobial product, a blowing agent, or any combination of the foregoing.

Useful polyisocyanates include in principle any known compounds having two or more isocyanate groups in the molecule, alone or in combination. In some instances, diisocyanates may be preferable. For example, the process may use diphenylmethane diisocyanate (MDI), tolylene diisocyanate (TDI), or MDI-TDI mixtures. The diphenylmethane diisocyanate used may be monomeric diphenyl diisocyanate selected from a group consisting of 2,2'-diphenylmethane diisocyanate, 2,4'-diphenylmethane diisocyanate, 4,4'-diphenylmethane diisocyanate, or mixtures of two or all three isomers, and also mixtures of one or more monomeric diphenylmethane diisocyanates with higher-nuclear homologs of diphenylmethane diisocyanate. The viscosity of diphenylmethane diisocyanate at 20 degrees Celsius may be less than 200 mPas, less than 150 mPas, or less than 100 mPas. In some instances, it may be desirable for the proportion of 2,2'-diphenylmethane diisocyanate to be less than 5 wt %, based on the total weight of polyisocyanates. When referring to an MDI isomer blend, either high or low levels of 2, 4-MDI or 4, 4'-MDI may be noted. A high 4, 4'-MDI blend corresponds to 50-80% of the MDI isomer blend. Whereas, low 4, 4'-MDI would correspond to 15-50% of the MDI isomer blend. Alternately, high 2, 4-MDI would contain 15-50% 2-4-MDI, and low 2, 4-MDI would contain 0-25%. For this embodiment, the total MDI blend (combination of 4, 4'-MDI and 2, 4-MDI) may be used anywhere from 30-37% of the total formulation weight when a high 4, 4'-MDI blend is used. In other instances, 31-37% MDI may be used when a high 2, 4-MDI blend is used. For example, in some instances, it may be desirable to use a formulation with a high 4, 4 MDI and high 2, 4 MDI combination, where about 30-37% total formulation by weight is the high 4, 4 MDI and 31-38% total formulation by weight.

In instances where TDI is used, it may be mixtures of the 2,4- and the 2,6-isomer which are used. Commercially available mixtures with 80% 2,4 and 60% 2,6 TDI and 35% 2,4 and 35% 2,6 TDI may be used.

In place of pure or blended isocyanates, modified isocyanates may be used. These modified isocyanates may be formed, for example, through incorporation of groups into the polyisocyanates. Examples of such groups include urethane, allophanate, carbodiimide, uretoneimine, isocyanurate, urea and biuret groups.

In some instances, it may be desirable to utilize polyisocyanates that are modified with urethane groups, these polyisocyanates may be prepared by reacting the isocyanates with a deficiency of compounds having two or more isocyanate-reactive hydrogen atoms. Compounds formed therefrom may be referred to as NCO prepolymers. The compounds used and having two or more isocyanate-reactive hydrogen atoms may be polymeric compounds having isocyanate-reactive groups and/or chain-extending and/or crosslinking agents. In some embodiments, preference may be given to carbodiimide- or uretoneimine-containing polyisocyanates, which may be formed by specific catalyzed reaction of isocyanates with themselves. Additionally, mixtures of TDI and MDI may also be used.

Polymeric compounds having isocyanate-reactive groups have an average molecular weight of at least 450 g/mol and may range from 460 to 12,000 g/mol; and these groups may also have two or more isocyanate-reactive hydrogen atoms per molecule. Polymeric compounds having isocyanate-reactive groups may include polyester alcohols and/or polyether alcohols having a functionality of 2 to 8, more particularly of 2 to 6, and even more particularly 2 to 4 and an average equivalent molecular weight may range from 400 to 3000 g/mol, and in some embodiments may range from 1000 to 2500 g/mol.

In some embodiments, polyether alcohols are used. Polyether alcohols may be obtainable by known methods, usually via catalytic addition of alkylene oxides, especially ethylene oxide and/or propylene oxide, onto H-functional starter substances, or via condensation of tetrahydrofuran. When alkylene oxides are used, the products are also known as polyalkylene oxide polyols. Useful H-functional starter substances may include especially polyfunctional alcohols and/or amines. Preference may be given to using water, dihydric alcohols (e.g. ethylene glycol, propylene glycol, or butane diols), trihydric alcohols (e.g. glycerol or trimethylolpropane), and/or more highly hydric alcohols (e.g. pentaerythritol, sugar alcohols, for example sucrose, glucose, or sorbitol). In some embodiments, the amines are aliphatic amines having up to 10 carbon atoms, for example ethylenediamine, diethylenetriamine, propylenediamine. In other embodiments, the amines are amino alcohols, such as ethanolamine or diethanolamine. The alkylene oxides used are may be ethylene oxide and/or propylene oxide; polyether alcohols used for preparing flexible polyurethane foams frequently have an ethylene oxide block added at the chain end. Useful catalysts for the addition reaction of alkylene oxides may include especially basic compounds (e.g. potassium hydroxide). When the level of unsaturated constituents in the polyether alcohols is to be low, di- or multi-metal cyanide compounds (so-called DMC catalysts) may also be used as catalysts. Viscoelastic flexible polyurethane foams may be produced using especially two- and/or three-functional polyalkylene oxide polyols.

Useful compounds having two or more active hydrogen atoms may further include polyester polyols obtainable for example from organic dicarboxylic acids having 2 to 12 carbon atoms, preferably aliphatic dicarboxylic acids having 8 to 12 carbon atoms, and polyhydric alcohols, preferably diols, having 2 to 12 carbon atoms and preferably 2 to 6 carbon atoms. Useful dicarboxylic acids include for example succinic acid, glutaric acid, adipic acid, suberic acid, azelaic acid, sebacic acid, decanedicarboxylic acid, maleic acid, fumaric acid, phthalic acid, isophthalic acid, terephthalic acid and the isomeric naphthalene dicarboxylic acids. In some embodiments, use of adipic acid is preferable. The dicarboxylic acids may be used individually, and may also be mixed with one another. Furthermore, rather than the free dicarboxylic acids, it may also be possible to use the corresponding dicarboxylic acid derivatives, for example dicarboxylic esters of alcohols having 1 to 4 carbon atoms or dicarboxylic anhydrides.

Examples of alcohols having two or more hydroxyl groups, and especially diols include: ethanediol, diethylene glycol, 1,2-propanediol, 1,3-propanediol, dipropylene glycol, 1,4-butanediol, 1,5-pentanediol, 1,6-hexanediol, 1,10-decanediol, glycerol and trimethylolpropane. In some instances, preference may be given to using ethanediol, diethylene glycol, 1,4-butanediol, 1,5-pentanediol, 1,6-hexanediol, or mixtures of two or more thereof, especially mixtures of 1,4-butanediol, 1,5-pentanediol and 1,6-hexanediol. It is further possible to use polyester polyols formed from lactones (e.g., ε-caprolactone) or hydroxy carboxylic acids (e.g., w-hydroxycaproic acid and hydroxybenzoic acids). However, in some embodiments, the use of dipropylene glycol is preferred.

The polymeric compounds having isocyanate-reactive groups include: (1) 10 to 40 wt % of at least one polyalkylene oxide having a hydroxyl number of 90 to 300 mg KOH/g, based on a 3 to 6-functional starter molecule and a propylene oxide fraction, based on the alkylene oxide content, of 80 to 100 wt %; (2) 5 to 20 wt % of at least one polyalkylene oxide having a hydroxyl number of 10 to 60 mg KOH/g, based on a 2 to 4-functional starter molecule and a propylene oxide fraction, based on the alkylene oxide content, of 80 to 100 wt %; (3) 10 to 50 wt % of at least one polyalkylene oxide having a hydroxyl number of 10 to 55 mg KOH/g, based on a 2 to 4-functional starter molecule and an ethylene oxide fraction, based on the alkylene oxide content, of 70 to 100 wt %; and (4) 0 to 20 wt %, preferably 1-20 wt % of at least one polyalkylene oxide having a hydroxyl number of 50 to 200 mg KOH/g, preferably 56-200 mg KOH/g, based on a 2-functional starter molecule and an ethylene oxide fraction, based on the alkylene oxide content, of 80 to 100 wt %, all based on the total weight of polymeric compounds having isocyanate-reactive groups.

In some instances, it may be preferable to use exclusively polyether polyols as polymeric compounds having isocyanate-reactive groups. In these instances, it may be further preferable that the polymeric compounds having isocyanate-reactive groups comprise the polyetherols (1) to (4) at not less than 80 wt %, preferably not less than 85 wt %, more preferably not less than 90 wt % and especially not less than 95 wt %, all based on the total weight of the polymer compounds having isocyanate-reactive groups. In some such embodiments, the polymeric compounds having isocyanate-reactive groups, in addition to the polyetherols (1) to (4) may not contain any further polymeric compounds having isocyanate-reactive groups.

In some embodiments, it is particularly preferable for the polyetherols, aside from the starter, to include essentially exclusively ethylene oxide and propylene oxide units. As used herein, "essentially" is to be understood as meaning that small amounts of other alkylene oxide units are not disadvantageous. The fraction of alkylene oxide units other than ethylene oxide or propylene oxide units may be less than 5 wt %, less than 1 wt %, or even 0 wt %, all based on the total weight of alkylene oxide units.

In some embodiments, the chain-extending agents and/or crosslinking agents used may be substances having a molecular weight of below 400 g/mol and, in some instances, preferably in the range from 60 to 350 g/mol, chain extenders having 2 isocyanate-reactive hydrogen atoms and crosslinkers having 3 or more isocyanate-reactive hydrogen atoms. These may be used individually or in the form of mixtures. Preference may be given to using diols and/or triols having molecular weights less than 400, in the range from 60 to 300, or in the range from 60 to 150. Some examples include aliphatic, cycloaliphatic and/or aromatic diols, and also diols having aromatic structures, with 2 to 14 and preferably 2 to 10 carbon atoms, such as ethylene glycol, 1,3-propanediol, 1,10-decanediol, o-dihydroxycyclohexane, m-dihydroxycyclohexane, p-dihydroxycyclohexane, diethylene glycol, dipropylene glycol and preferably 1,4-butanediol, 1,6-hexanediol and bis(2-hydroxyethyl)hydroquinone, triols, such as 1,2,4-trihydroxycyclohexane, 1,3,5-trihydroxycyclohexane, glycerol and trimethylolpropane, and low molecular weight hydroxyl-containing polyalkylene oxides based on ethylene oxide and/or 1,2-propylene oxide and the aforementioned diols and/or triols as starter molecules. In some instances, monoethylene glycol, 1,4-butanediol and/or glycerol may be preferred for as chain extenders.

In embodiments, where chain-extending agents, crosslinking agents, or mixtures thereof are used, the amounts in which they are use may range from 0.1 to 20 wt %, from 0.5 to 10 wt %, or from 0.8 to 5 wt %, based on the weight of the polymeric compounds having isocyanate-reactive groups and the chain-extending agents.

In addition to polymeric compounds having isocyanate-reactive groups, it is optionally also possible to use one or more compounds having just one isocyanate-reactive group.

These compounds are for example monoamines, monothiols and/or monoalcohols, for example, based on polyethers, polyesters or polyether-polyesters. Monoalcohols used, may be polyether monools obtained on the basis of monofunctional starter molecules, for example ethylene glycol monomethyl ether. These may be obtainable similarly to the polyetherols described above via polymerization of alkylene oxide onto the starter molecule. Polyether monools may have a high proportion of primary OH groups. In some embodiments, it may be desirable to prepare polyether monools using ethylene oxide as sole alkylene oxide. These monools may further include compounds having an aromatic group. The average molecular weight of compounds having one isocyanate-reactive may be in the range from 50 to 1000 g/mol, from 80 to 300 g/mol, or from 100 to 200 g/mol. When compounds having one isocyanate-reactive group are used, they may be used in a proportion of 0.1 to 5 wt % or 0.5 to 4.5 wt %, based on the total weight of polymeric compounds having isocyanate-reactive groups and compounds having just one isocyanate-reactive group.

Useful catalysts for preparing the viscoelastic polyurethane foams used to form the molded core 12 may be compounds that greatly speed the reaction of the hydroxyl-containing components with the polyisocyanates and/or the reaction of isocyanates with water. Examples may include amidines, such as 2,3-dimethyl-3,4,5,6-tetrahydropyrimidine, tertiary amines, such as triethylamine, tributylamine, dimethylbenzylamine, N-methylmorpholine, N-ethylmorpholine, N-cyclohexylmorpholine, N,N,N',N'-tetramethylethylenediamine, N,N,N',N'-tetramethylbutanediamine, N,N,N',N'-tetramethylhexanediamine, pentamethyldiethylene-triamine, tetramethyldiaminoethyl ether, bis(dimethylaminopropyl)urea, dimethylpiperazine, 1,2-dimethylimidazole, 1-azabicyclo-(3,3,0)-octane and preferably 1,4-diazabicyclo-(2,2,2)-octane, and/or alkanolamine compounds, such as triethanolamine, triisopropanolamine, N-methyl-diethanolamine, N-ethyldiethanolamine and dimethylethanolamine. Similarly suitable may be organic metal compounds, preferably organic tin compounds, such as tin(II) salts of organic carboxylic acids, e.g., tin(II) acetate, tin(II) octoate, tin(II) ethylhexanoate and tin(II) laurate, and the dialkyltin(IV) salts of organic carboxylic acids, for example dibutyltin diacetate, dibutyltin dilaurate, dibutyltin maleate and dioctyltin diacetate, and also bismuth carboxylates, such as bismuth(III) neodecanoate, bismuth 2-ethylhexanoate and bismuth octanoate, or mixtures thereof. The organic metal compounds may be used alone or in combination with strong basic amines. When the polymeric compound having isocyanate-reactive groups is an ester, it may be preferable to use exclusively amine catalysts.

In some embodiments, the catalyst or catalyst combination used may range from 0.001 to 5 wt % or from 0.05 to 2 wt %, based on the weight of the polymeric compound having isocyanate-reactive groups.

Polyurethane foams may be produced in the presence of one or more blowing agents. Furthermore, it is possible to use a chemically acting blowing agent and/or physically acting compounds, which may react with the polyurethane foams. Chemically acting blowing agents are compounds that may react with isocyanate to form gaseous products, for example water or formic acid. Physically acting blowing agents are compounds that have been dissolved or emulsified in the reactants of polyurethane synthesis and vaporize under the conditions of polyurethane formation. Examples include hydrocarbons, halogenated hydrocarbons, and other compounds, for example perfluorinated alkanes, such as perfluorohexane, chlorofluorocarbons, and ethers, esters, ketones and/or acetals, for example (cyclo)aliphatic hydrocarbons having 4 to 8 carbon atoms, hydrofluorocarbons, such as Solkanes® 365 mfc, or gases, such as carbon dioxide. In one embodiment, the blowing agent used may be a mixture of these blowing agents, comprising water, or exclusively water.

Where present, the amount of physically acting blowing agents may range between 1 and 20 wt % or 5 and 20 wt %; while the amount of water may be in the range between 0.5 and 8 wt %, between 0.8 and 6 wt %, or between 1 and 5 wt %, all based on the total weight of other components of the reaction.

Additional additives, auxiliaries and/or the like may include, but not be limited to: surface-active substances; foam stabilizers; cell regulators; external and internal release agents; fillers; pigments; dyes; flame retardants; antistats; hydrolysis control agents; and/or fungistats or bacteriostats (such as described below).

To produce an exemplary viscoelastic polyurethane foam for use in the molded core 12 of the disclosed pillow 10, the polymeric compounds with isocyanate-reactive groups, the chain-extending and/or crosslinking agents (which are optional), the compounds with one isocyanate-reactive group with a hydroxyl number of 100 to 500 mg KOH/g (which are optional), the catalysts, the blowing agents, and the auxiliaries and/or addition agents (which are optional) may be mixed to form a polyol component and reacted in that form with the polyisocyanates. The polyisocyanate prepolymers may be reacted with the polyol component. The mixing ratios may be selected such that the equivalence ratio of NCO groups of polyisocyanates to the sum total of reactive hydrogen atoms of compounds that make up the polyol component is in a range from 0.65 to 1.2:1, preferably in the range from 0.7 to 1.1:1 and especially in the range from 0.1 to 1:1. A ratio of 1:1 here corresponds to an isocyanate index of 100.

The viscoelastic foam used for the molded core 12, may be, for example, produced by a one-shot process, using a high-pressure or a low-pressure technique. In such a one-shot process the molds may be positioned on a carousel or circular conveyor that may rotate continuously where the formulation is injected or "shot" into the mold. Once the core has completed the circuit it is moved from the carousel or circular conveyor and another shot of reacting material is added to the mold. In some embodiments, the mold is an open mold; while in other embodiments, the mold is a closed mold. The mold may be constructed of metal, wood, fiberglass, epoxy, or any other suitable material, or combination of materials, known in the art.

In embodiments where the two-component process is utilized a polyol component is produced and foamed with polyisocyanate. The components may then be mixed at a temperature ranging between about 18 and about 27 degrees Celsius, preferably between about 20 and about 25 degrees Celsius and then introduced into the mold. The temperature in the mold may be ranging between about 15 and about 120 degrees Celsius, preferably between about 30 and about 80 degrees Celsius. The shot path and mold angle may vary. The shot path is the path by which the reacting foam mixture is dispensed into the mold. In some embodiments, the path may begin in the center of the mold and fully dispense at that spot, this may be referred to as a "stationary shot." Further, this stationary shot may also take place in any of the four quadrants of the mold, as opposed to the center of the mold. In other embodiments, shot path may begin in the top right quadrant (or any other quadrant in the mold) and move to bottom left quadrant (or any other quadrant in the mold)

dispensing for the full length of that route. Mold angle may include both the shot angle and the cure angle. The shot angle is the mold tilt at which the reacting foam mixture is shot into the mold. The shot angle occurs at about 90 degrees (a flat pour), but the angle can be adjusted forward (~5 degrees) or backward (~5 degrees) depending on the processing requirements of the foam. The cure angle is the angle at which the closed mold is rotated to allow for a proper cure and degassing of the foaming material. The cure angle may vary from 0-180 degrees. In some embodiments, the cure angle utilized in the manufacturing of the molded foam core described herein may be from about 10-180 degrees; in other embodiments, cure angle utilized in the manufacturing of the molded foam core described herein may be from about 0-90 degrees.

Figure 3:
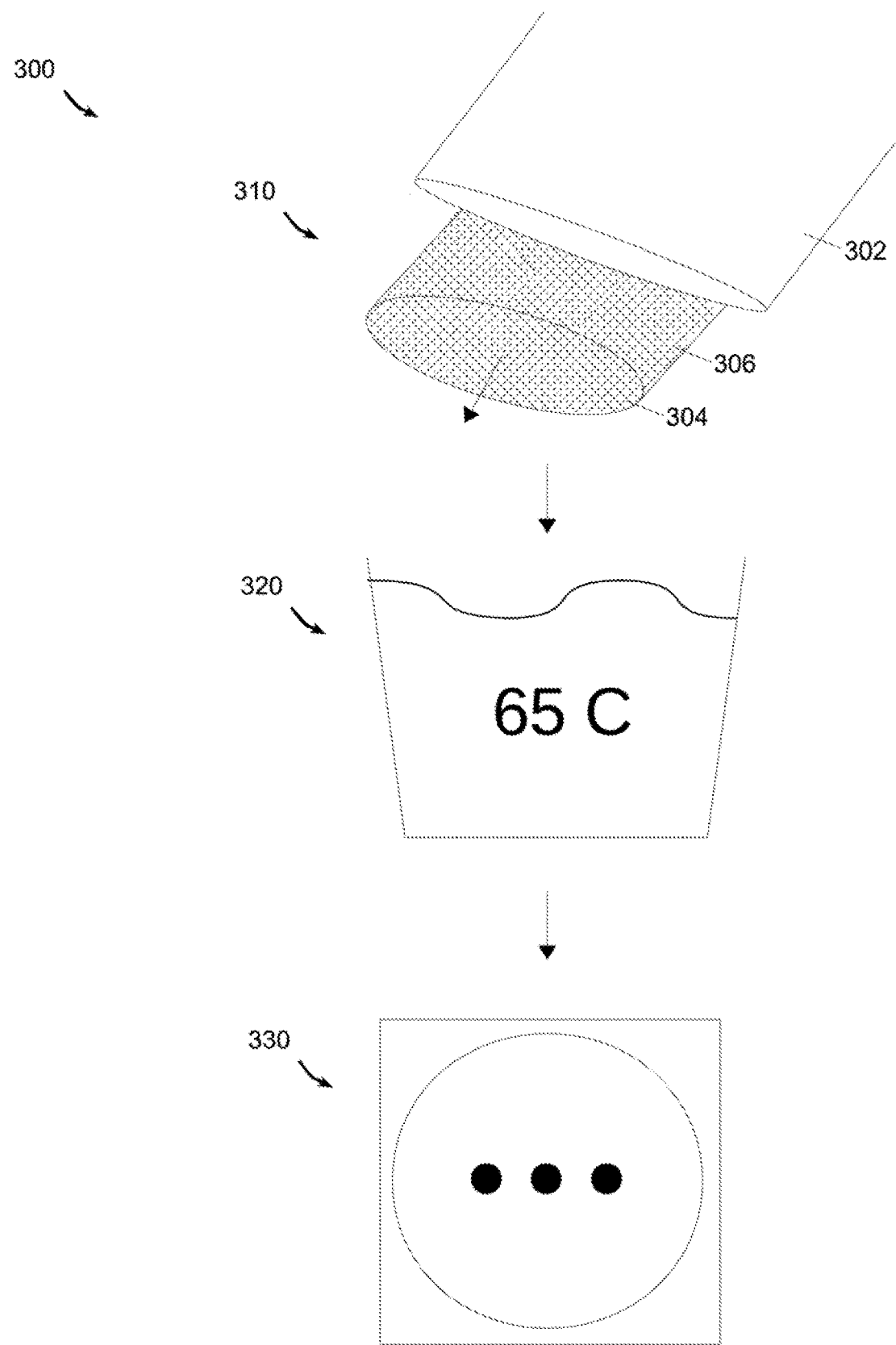
FIG. 3 is an exemplary schematic of a method of washing a molded foam core pillow consistent with the description herein.

Referring now to FIG. 3, a schematic of an exemplary embodiment of a method 300 of laundering a molded foam core pillow as described herein is illustrated. A step 310, a cover 302 of the pillow may be removed for laundering, leaving the molded foam core 304 within a sleeve or netting 306. In some embodiments, the cover 302 may be laundered alongside the molded foam core 304 within the sleeve or netting 306; while in other embodiments, the cover 302 may be laundered separately. Furthermore, in still other embodiments, the cover 302 may be removed and laundered without laundering the molded foam core; for example, in some instances (e.g. if a user suffers from allergies) it may be desirable to remove the cover 302 and launder it on a more frequent basis.

At step 320, the molded foam core 304 within the sleeve or netting 306 may be washed, optionally subjected to a spin cycle, in an ordinary household washing machine. For example, the molded foam core 304 within the sleeve or netting 306 may be capable of withstanding washing on a "warm" cycle of a household washing machine. The water temperature designated as "warm" may vary across various brands and/or models of household washing machines, but "warm" may mean a temperature of at least 30 degrees Celsius, at least about 40 degrees Celsius, at least about 50 degrees Celsius, at least about 60 degrees Celsius, or at least about 70 degrees Celsius. As illustrated in step 320 of FIG. 3, the molded foam core 304 within the sleeve or netting 306 is washed at 65 degrees Celsius, but this is not to be understood as limiting.

At step 330, the molded foam core 304 within the sleeve or netting 306 is and then tumble-dried. In some embodiments, such as illustrated in FIG. 3, the foam core 304 and sleeve 306 are tumble-dried on a "high" heat cycle in a household dryer. While the temperature considered "high" heat may vary across various brands and/or models of household dryers, "high" heat may mean a temperature between about 50 degrees Celsius and about 65 degrees Celsius or higher (as indicated by the three dot symbol). The foam core 304 and sleeve 306 may then be tumble-dried for about 0.5 hour, about 1 hour, about 1.5 hours, or about 2 hours on a high heat cycle without damage such as cracked foam or loss of mechanical and viscoelastic properties.

In some embodiments, the molded foam core 12 may further include an antimicrobial agent incorporated into the foam formulation that allows a foam core to be produced that is resistant to various fungal or bacterial species; species that may, for example cause odor or stains to develop on or in the pillow. Various types of antimicrobial agents may be commercially available for use; these commercially available antimicrobial agents may, for example, include active ingredients such as silver and/or zinc. Some examples of a commercially available agents includes, for example, AlphaSan® (Milliken, Spartanburg, S.C.), which utilizes silver ions as an active ingredient with a zirconium phosphate based carrier, and DW30 (Thomson Research Associates, Toronto, Ontario), which contains zinc omadine, thiabendazole, and oxydipropyl dibenzoate. In embodiments utilizing AlphaSan® as an antimicrobial additive may serve as a reservoir for the controlled release of the silver ions, which interact with microorganisms damaging the microorganisms. In other embodiments, the antimicrobial agent may utilize zinc pyrithione technology, which disrupts transport mechanisms in microorganisms. The antimicrobial agents utilized can include, but are not limited to, pyrithione compounds, thiabendazole, hydrogen peroxide, silver, 2-butyl-1,2-benzothiazol-3(2H)-one, oxydipropyl dibenzoate, or similar active biocidal components. In some embodiments, the selected antimicrobial may be added at a concentration of about 500 ppm and about 7000 ppm. In some embodiments, the selected antimicrobial may allow the molded foam core to pass the ASTM E2149 biocide test for at least about five, at least about seven, or at least about 10 wash and dry cycles.

EXAMPLES

Example 1

Water uptake of samples of viscoelastic foam were tested as follows. Each of the two samples were weighed, washed in a household washing machine at a water temperature of 60 degrees Celsius on a high spin cycle, and weighed again. The samples were then tumble-dried for one hour, removed, and weighed a third time. The samples were then returned to the dryer and tumble-dried for another hour, removed and weighed again (for a fourth time). This process was replicated 18 times for each sample, an average of the results from which are presented herein in Table 1. As illustrated in Table 1, the average water remaining after a first dry cycle is between 11% and 14%, which would feel dry to a user.

The Allergy and Asthma Foundation of America requires a pillow have certain characteristics in order to be certified as asthma and allergy friendly. Included in those characteristics is the ability to withstand 18 wash cycles. Various physical properties, including ILD (indention load deflection) and CLD (compression load deflection), both of which are measures of firmness or stiffness, were measured. Various hot compression sets, which are measures of permanent deformation following compression between two metal plates for a controlled period of time and temperature, were also examined. Tensile strength, which measures the amount of force required to break an area of foam as it is pulled apart, and elongation, which measures the extent the foam may be stretched before breaking expressed as a percentage of its original length, were also measured. Finally, ball rebound, which measures elasticity, bounce, or springiness of foam, was determined. No significant change was found between the pre-wash pillow and post-wash pillow. The results of these various tests of physical properties are illustrated in Table 2 herein. Conventionally, molded core pillows have issues maintaining their physical integrity when washed. As illustrated by Table 2 there is little change in the physical properties of the sample pillows, indicating they maintain their physical integrity through wash and dry cycles.

Other characteristics required for the Allergy and Asthma Foundation of America certification include: 1) providing an effective barrier to the passage of allergen; 2) any allergen that may accumulate on the outer surface of the pillow must be removable by the recommended eradication techniques (e.g. washing) at stipulated intervals; 3) the fabric of the pillow must be 'breathable' to ensure user comfort; and 4) the pillow must not contain chemicals known to trigger allergenic or irritant responses when present above certification levels.

TABLE 1

| Sample | Average Weight Pre-Wash (kg) | Average Weight Post-Wash (kg) | Average Weight Post-Dry Cycle 1 | Average Weight Post-Dry Cycle 2 | Average Water Uptake (%) | Average Water Left After 1 Dry Cycle (%) |
|---|---|---|---|---|---|---|
| 1 | 1.35 | 1.66 | 1.46 | 1.37 | 30 | 14 |
| 2 | 1.32 | 1.86 | 1.66 | 1.57 | 25 | 11 |

TABLE 2

| Test | Test Standard | Pre-Wash | Post-Wash |
|---|---|---|---|
| ILD 40% | ISO 2439 | 48.77 | 51.43 |
| CLD 40% (10 × 10 × 5 cm) (kPa) | ISO 3386 | 0.87 | 0.98 |
| Density (kg/m$^3$) | ASTM D3574 Test A | 56.10 | 56.42 |
| Hot Compression Set Height Loss (%) | ASTM D3574 Test D | 1.37% | 1.17% |
| Hot Compression Set Hardness Loss (%) | ASTM D3574 Test D | 11.03% | 13.52% |
| Wet Compression Set Height Loss (%) | Internal Standard | 0.16% | 0.60% |
| Wet Compression Set Hardness Loss (%) | Internal Standard | 7.2% | 11.36% |
| Dynamic Fatigue Height Loss (%) | Internal Standard | 0.12% | 0.05% |
| Dynamic Fatigue Hardness Loss (%) | Internal Standard | 0.65% | 0.36% |
| 90% Hot Compression Set Height Loss (%) | ASTM D3574 Test D | 2.01% | 1.21% |
| 90% Hot Compression Set Hardness Loss (%) | ASTM D357 Test D | 14.33% | 12.11% |
| Ball Rebound (%) | ASTM D3574 Test H | 0 | 2 |
| Tensile Strength (kPa) | Internal Standard | 44.1 | 52.5 |
| Elongation (%) | Internal Standard | 270 | 296 |
| Resimat Recovery (s) | Internal Standard | 1.0 | 1.2 |

Example 2

During a water uptake analysis as described with respected to Example 1, volunteers were polled in order to determine a definition for "dry". When the sample pillows were removed from the dryer after 60 minutes for a weight measurements volunteers were asked if they thought the sample pillow felt dry and whether they would put the sample pillow back into the dryer for another cycle.

In samples where 13% of water remained in sample pillow 11 out of 12 volunteers stated they thought the sample pillow was dry. In samples where 29% of water remained in the sample pillow 6 out of 6 volunteers stated they thought the sample pillow was dry. Based on these results, "dry" was defined as a pillow having less than 20% water remaining after one 60 minute, high heat, dry cycle.

Various features of the invention are set forth in the following claims.

What is claimed is:

1. A washable pillow comprising:
    a molded viscoelastic foam core having a hydrophobicity defined by a measured water uptake between about 0% (w/w) and about 30% (w/w), an average cell size between about 0.16 mm and about 3 mm, and an air permeability between about 1.0 liters per second and about 6.0 liters per second;
    wherein the molded viscoelastic foam core has a post-drying measured water uptake of less than about 20% after a single wash and dry cycle, the post-drying measured water uptake determined by (i) measuring a first weight of the molded viscoelastic foam core prior to washing and drying, (ii) washing the molded viscoelastic foam core in water, (iii) drying the molded viscoelastic foam core at a temperature of about 50-65° C. for between about 60 minutes and about 120 minutes, (iv) measuring a second weight of the molded viscoelastic foam core immediately after drying, and (v) comparing the first weight to the second weight to determine a percentage weight increase, and
    wherein the molded viscoelastic foam core is a solid, continuous piece of foam; and
    an antimicrobial agent incorporated into the molded viscoelastic foam core.

2. The washable pillow of claim 1, wherein the viscoelastic foam has a hydrophobicity between about 25% (w/w) and about 30% (w/w).

3. The washable pillow of claim 1, wherein the viscoelastic foam has an average cell size between about 0.17 mm and about 2 mm.

4. The washable pillow of claim 1, wherein the viscoelastic foam has an average cell size between about 0.17 and about 1 mm.

5. The washable pillow of claim 1, wherein the molded viscoelastic foam has an air permeability between about 2.0 liters per second and about 4.0 liters per second.

6. The washable pillow of claim 1 further includes a sleeve defining a cavity, the sleeve comprising a first netting layer and a second netting layer that are connected together to form a cavity there between.

7. The washable pillow of claim 6, wherein the first netting layer or the second netting layer are constructed of a woven fabric, a non-woven fabric, polyester material, polyester-blend, or combination thereof.

8. The washable pillow of claim 1, wherein the post-drying measured water uptake is between about 11% and about 14%.

9. The washable pillow of claim 1, wherein the antimicrobial agent in the molded viscoelastic foam core includes silver ions or zinc as active ingredients.

10. The washable pillow of claim 1, wherein the antimicrobial agent in the molded viscoelastic foam core includes zinc omadine, thiabendazole, and oxydipropyl dibenzoate.

11. The washable pillow of claim 1, wherein the antimicrobial agent is added at a concentration ranging from about 500 ppm to about 7000 ppm.

12. The washable pillow of claim 1, further comprising a crosslinking agent incorporated into the molded viscoelastic foam core.

13. The washable pillow of claim 11, wherein an amount of the crosslinking agent used ranges from about 0.8 to 5 wt % based on a weight of polymeric compounds having isocyanate-reactive groups and chain-extending agents.

14. A method of washing a molded foam core pillow, the method including:
removing a cover from a molded viscoelastic foam core;
wherein the molded viscoelastic foam core is a solid, continuous piece of foam;
wherein the molded viscoelastic foam core remains with a netting;
wherein the molded viscoelastic foam core has a hydrophobicity defined by a measured water uptake between about 0% (w/w) and about 30% (w/w), an average cell size between about 0.16 mm and about 3 mm, and an air permeability between about 1.0 liters per second and about 6.0 liters per second; and
wherein an antimicrobial agent is incorporated into the molded viscoelastic foam core;
washing the molded viscoelastic foam core on a single wash cycle; and
drying the molded viscoelastic foam core on a single drying cycle at high heat at a temperature of about 50-65° C. for between about 60 minutes and about 120 minutes,
wherein the drying reduces the measured water uptake of the molded viscoelastic foam to a second measured water uptake of the molded viscoelastic foam core of less than about 20%, the second measured water uptake determined by (i) measuring a first weight of the molded viscoelastic foam core prior to washing and drying, (ii) washing the molded viscoelastic foam core on the single wash cycle, (iii) drying the molded viscoelastic foam core on the single drying cycle, (iv) measuring a second weight of the molded viscoelastic foam core immediately after the single drying cycle, and (v) comparing the first weight to the second weight to determine a percentage weight increase.

15. The method of claim 14, wherein the washing on the wash cycle includes washing at a wash temperature between about 30 degree Celsius and about 60 degrees Celsius.

16. The method of claim 14, wherein the measured water uptake is between about 25% and about 30%.

17. The method of claim 14, wherein the second measured water uptake of the molded viscoelastic foam core is between about 11% and about 14%.

18. The method of claim 14, wherein the high heat reaches a temperature between about 50 degrees Celsius and about 65 degrees Celsius or higher.

19. The method of claim 14, wherein the predetermined time is between about 60 minutes and about 120 minutes.

20. An antimicrobial washable pillow comprising:
a molded viscoelastic foam core;
wherein the molded viscoelastic foam core has a hydrophobicity defined by a water uptake between about 25% (w/w) and about 30% (w/w), an average cell size between about 0.17 mm and about 3.0 mm, and an air permeability between about 2.0 liters per second and about 4.0 liters per second, and wherein the molded viscoelastic foam core is a solid, continuous piece of foam;
an antimicrobial agent incorporated into the molded viscoelastic foam core, wherein the antimicrobial includes zinc omadine, thiabendazole, and oxydipropyl dibenzoate at a concentration ranging from about 500 ppm to about 7000 ppm; and,
a polyester netting sleeve defining a cavity, wherein the molded viscoelastic foam core is enclosed within the cavity.

* * * * *